United States Patent [19]

Syska

[11] 4,111,687
[45] Sep. 5, 1978

[54] PROCESS FOR THE PRODUCTION OF INTERMEDIATE HOT METAL

[75] Inventor: Andrew J. Syska, Marblehead, Mass.

[73] Assignee: Consolidated Natural Gas Service Company, Inc., Pittsburgh, Pa.

[21] Appl. No.: 737,699

[22] Filed: Nov. 1, 1976

[51] Int. Cl.² ............................................. C21C 5/52
[52] U.S. Cl. ........................................ 75/13; 75/38; 75/40; 75/48; 75/60
[58] Field of Search .................. 75/38, 40, 12, 13, 48, 75/60

[56] References Cited

U.S. PATENT DOCUMENTS

| | | | |
|---|---|---|---|
| 2,182,009 | 12/1939 | Wiberg | 75/40 |
| 3,301,661 | 1/1967 | McGlynn et al. | 75/43 |
| 3,356,488 | 12/1967 | Walsh | 75/38 |
| 3,936,296 | 2/1976 | Campbell | 75/34 |

*Primary Examiner*—M. J. Andrews
*Attorney, Agent, or Firm*—Fish & Neave

[57] ABSTRACT

A process and apparatus for the production of intermediate hot metal suitable for further refining into steel is disclosed.

The basic process includes the steps of heating a charge of ore in a reducing furnace having a reducing atmosphere therein comprising a mixture of reconditioned and recycled top gas from the reducing furnace and off-gas rich in hydrogen and carbon monoxide produced by a cupola melting unit to reduce the ore to iron, partially carburizing the reduced iron in the reducing furnace with carbon-containing off-gas produced by the cupola melting unit, and melting the reduced and carburized iron together with scrap, slag forming additives and fluxes in a cupola melting unit having a reducing atmosphere therein produced by the combustion of a rich fuel/oxidant mixture to form a molten slag and molten iron suitable for the further refining to produce steel. The process contemplates the further refining of the molten iron from the cupola in an electric steelmaking furnace or an oxygen steelmaking converter. In an alternative form of the process, the reduced and carburized iron is cooled within or outside the reducing furnace to form prereduced metal pellets suitable for use as a part of the burden in a melting unit.

The apparatus comprises a refractory lined cupola melting unit portion equipped with burners capable of burning a rich fuel/oxidant mixture to produce a reducing atmosphere within the melting unit and off-gas rich in gaseous reductants, a direct reducing unit portion communicating with the upper end of the melting unit to receive the melting unit off-gas recirculating and conditioning means to recycle at least a portion of the top gas from the upper region of the reducing unit portion to the lower region of the reducing unit portion, means for introducing ore into the direct reduction unit portion of the apparatus, and means for introducing additives and fluxes into the melting unit portion of the apparatus.

21 Claims, 7 Drawing Figures

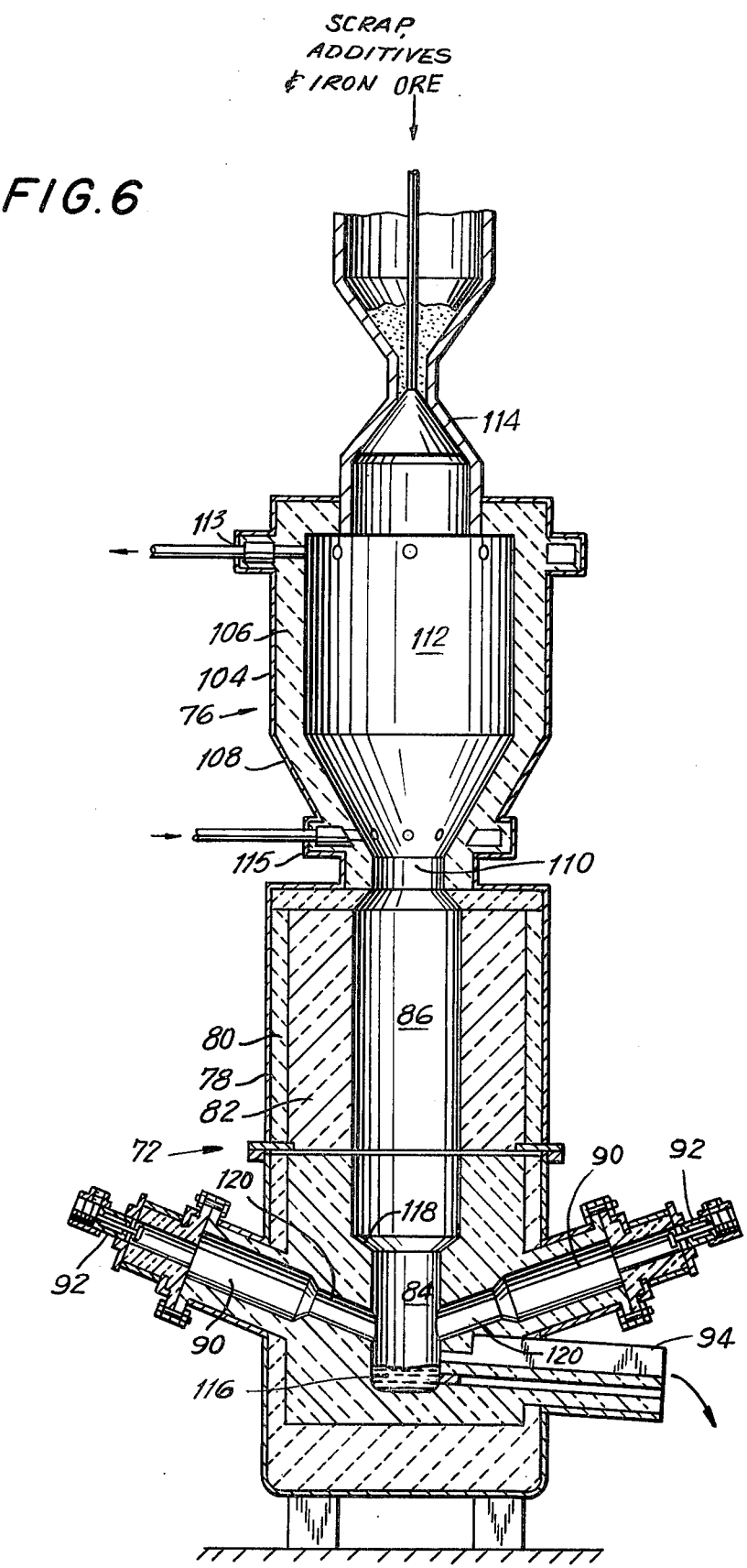

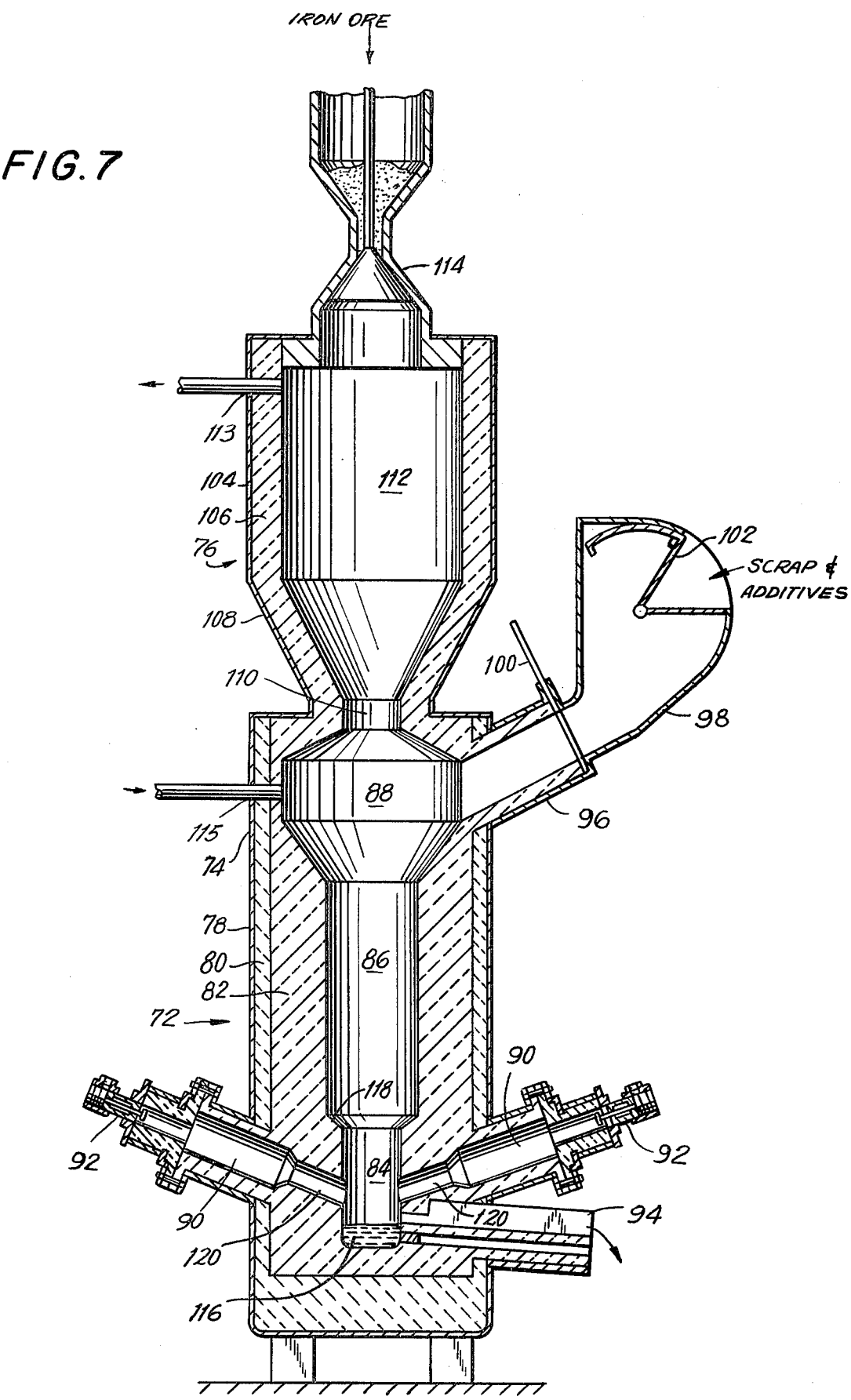

PROCESS FOR THE PRODUCTION OF INTERMEDIATE HOT METAL

BACKGROUND OF THE INVENTION

1. Field of the Invention

This invention relates generally to the field of iron and steelmaking and more particularly to a process and apparatus for the production of low carbon hot metal or steel including steps involving gaseous direct reduction or ore and melting of the prereduced ore.

Iron exists in nature generally in the form of an oxide. Common forms of the oxide are hematite ($Fe_2O_3$) and magnetite ($Fe_3O_4$). In order to produce steel, the iron oxides must be reduced to substantially the metallic form. Conventionally, this may be accomplished by reducing the oxides with carbon, carbon monoxide or hydrogen. Such reactions are usually accomplished in a blast furnace and the resulting product is a hot metal containing about 4% of carbon and various impurities such as sulfur, phosphorous, manganese and silicon which have been picked up from the ore and coke during the smelting process.

The hot metal may thereafter be refined to steel in a steelmaking furnace. Some of the impurities, such as carbon, silicon and manganese may be removed by oxidation while other impurities such as sulfur and phosphorous are normally removed by slag-metal reactions. The process of making steel by smelting iron ore to produce steel may be termed an "indirect" process of steelmaking. In contrast, processes have been proposed for many years by which the ore may be reduced directly to iron without the use of a subsequent refining step--the so-called "direct" reduction process. The theory of the direct reduction process is that upon heating of the ore in a reducing atmosphere, the oxides will be reduced to iron and further heating of the reduced iron will produce molten iron. One practical difficulty with the direct reduction process is that the molten iron tends to absorb and retain impurities, particularly sulfur and phosphorous, from the ore and other raw materials used and thus the resulting product may be unsatisfactory. For this reason, most direct reduction processes have been limited to the production of "prereduced" or "metallized" pellets or briquettes intended to be melted and refined in a subsequent steelmaking process.

2. Description of the Prior Art

Due to the difficulties inherent in the direct reduction process for steelmaking, the major steelmaking processes used during the last century have been based upon the reduction of ore to form hot metal in a blast furnace. In some cases, the hot metal has been formed by melting steel scrap and pig iron in a cupola.

Beginning in the late 1850's, the pneumatic process represented by the bottom blown Bessemer converter was used as a refining furnace. The original Bessemer converter employed a silica lining and was limited to an acid process. Later the basic Bessemer or Thomas process was developed which utilized a basic lining and permitted the use of basic slags capable of removing sulfur and phosphorous from the hot metal. Although the Bessemer process typically produced heats of steel up to 25 to 35 tons in size in 12 to 15 minutes, the use of air as the oxidizing agent resulted in an undesirble pickup of nitrogen which limited the utility of the steel produced thereby.

While the Bessemer process was the principal steelmaking process used during the late 1800's, the Siemens-Martin or open hearth process, developed in the late 1870's soon became ascendant and remained dominant until about the 1950's. The open hearth process was capable of refining a charge of hot metal and steel scrap or, if desired, the open hearth could melt and refine a charge of cold pig iron and scrap. Beginning in the late 1940's, oxygen lances were added to the open hearth to speed up the refining process. The use of oxygen allowed the time required to produce a heat of steel to be reduced from a period of 10 to 12 hours to a period of 4 to 5 hours. The dominance of the open hearth process was due largely to its flexibility in handling various types of charges and the ability to produce high quality steel in heats as large as several hundred tons in size.

Shortly after the open hearth furnace began to be used commercially for steelmaking; the electric arc and the electric induction furnaces were developed. The electric furnaces, like the open hearth, were capable of using molten hot metal or cold pig iron or scrap charges and, in addition, could operate with a controlled atmosphere. Thus the electric furnaces were particularly suited to the refining of specialty steels whose premium prices could support the generally higher operating cost of the electric furnace.

Finally, beginning in the 1950's, the top blown oxygen converter appeared. In the top blown process, generally known as the BOF process, pure oxygen is jetted from above into a bath of hot metal and scrap. The BOF process combined the speed of operation characteristic of the earlier converter processes with the ability to produce steel of open hearth quality. Predictably, the BOF process has now become the leading steelmaking process. Despite its many advantages over earlier steelmaking processes, the BOF process requires a hot metal charge amounting to about 70% of the metallic charge and this, in turn, mandates that a blast furnace or other hot metal producing facility be available. To supply a typical modern BOF installation, the blast furnace must be capable of producing 7000 to 10000 tons of hot metal per day. Such a blast furnace, with its auxiliary coke oven facility, now costs upwards of $70,000,000 and is justifiable only where large scale operations may be installed to exploit large markets such as are available in many of the developed countries. Moreover, the blast furnace requires a large supply of metallurgical grade coke, the supply of which is limited.

Particularly in the developing countries, as well as in other areas where the market may be smaller, there is a need for efficient steelmaking facilities having an annual capacity in the range of 400,000 tons or less which do not require a blast furnace. Proposals to satisfy this market have been based upon the concept of using a direct reduction process to convert iron ore having an iron content preferably in the range about 60% and gangue content below 7% into pellets or briquettes metallized in the range of 80 to 95% and then melting and refining the pellets or briquettes in an electric furnace.

The usual gaseous reductant is a mixture of carbon monoxide and hydrogen formed by steam reforming of natural gas containing a large proportion of methane ($CH_4$). The endothermic reactions involved in steam reforming are:

$$CH_4 + CO_2 \rightarrow 2CO + 2H_2$$

and $$CH_4 + H_2O \rightarrow CO + 3H_2$$

Where carbon monoxide is the gaseous reductant, the net reaction with hematite is:

$$Fe_2O_3 + 3CO \rightarrow 2Fe + 3CO_2$$

This is an exothermic action. Where the gaseous reductant is hydrogen, the net reaction is endothermic and is shown by the following formula:

$$Fe_2O_3 + 3H_2 \rightarrow 2Fe + 3H_2O$$

The reactions set forth represent the theoretical minimum amount of reductant required to reduce the iron oxide. In the direct gaseous reduction of ores containing hematite ($Fe_2O_3$) and magnetite ($Fe_3O_4$), the higher oxides are progressively reduced to yield iron (Fe), carbon dioxide ($CO_2$) and water. In addition to the reducing action referred to above, the iron becomes carburized, generally to the range of 1 to 1½%. The carburizing reaction is as follows:

$$3Fe + 2CO \rightarrow Fe_3C + CO_2$$

While theoretically a 95% reduction should be attainable within a period of about an hour, existing plants require a period of 3 to 6 hours for the reduction process.

Over the years a large number of direct reduction processes have been proposed. At the present time the major gaseous direct reduction processes are the Midrex process developed by Midland Ross Corporation and the HyL process developed by the Mexican company Hojalata y Lamina. Somewhat similar gaseous direct reduction processes have been developed by Armco Steel Corporation and August Thyssen-Hüette A.G.

In the Midrex process a mixture of iron ore and pellets recycled from the process is delivered to the top of a shaft furnace where it is heated to a temperature of 760° C by a reducing gas containing carbon monoxide and hydrogen delivered to the central portion of the furnace at a temperature of about 1000° C. The reducing gas may be steam reformed natural gas supplemented by a portion of the top gas recycled from the furnace. The reduced ore, known as sponge iron, is cooled in the lower portion of the reducing furnace by circulating a cool gas through the furnace. The Midrex process produces pellets about ½ inches in size metallized to about 95% and containing between 0.7 and 2 percent carbon. The pellets leave the furnace at a temperature of about 40° C and are usually passivated to inhibit reoxidation during transport or storage. For the Midrex process, it has been estimated that about 12000 cubic feet of natural gas is required per ton of sponge iron. This translates to about 3 GK calories per ton or 12 million Btu per ton. In addition, electrical energy equivalent to about 1 MM Btu per ton of iron is required for fans, blowers and pumps. If it be assumed that the Midrex pellets are to be melted and refined in an efficient electric furnace, the energy required for melting and refining is about 610 Kwh/ton. Bearing in mind the efficiency in transforming fossil fuels into electrical energy, it is generally accepted that 1 KWH is equal to 10,500 Btu; thus the energy for melting and refining the Midrex pellets is about 6.4 million Btu/ton. The total energy required to produce a ton of steel by the use of Midrex pellets is thus on the order of 19.4 million Btu.

The Armco process is broadly similar to the Midrex process although the reducing reaction is conducted at a temperature of about 900° C. The Purofer process of August Thyssen-Hüette is also similar but is performed at a temperature of about 1000° C and the product normally is briquetted. An analysis of the Armco process indicates that about 12500 cubic feet of natural gas is required per ton of sponge iron as compared with 12000 cubic feet of natural gas per ton for the Midrex process. This difference is the result of the different engineering details of the two processes. Assuming that the same electric furnace was used to process the product of the Armco product as was used for the Midrex product, the total energy requirement to produce a ton of steel would be about 19.9 million Btu.

In contrast to the Midrex and Armco processes which may be described as progressive-feed vertical shaft processes which produce a moving bed, the HyL process is a batch-feed, fixed-bed process. In the HyL process, a batch of ore is placed in a shaft-type reactor vessel and is successively treated with an initial reducing gas, a final reducing gas, and a cooling gas. By providing four reaction vessels operated sequentially, a substantially continuous operation may be attained. The estimated Btu requirements to produce a ton of metallic iron at room temperature are about 20 million Btu if lump ore is reduced and about 17 million Btu if oxide pellets are used. Again, additional energy in the amount of about 6.4 million Btu is required to complete the refining and produce steel.

The thermodynamic energy requirement for melting a ton of iron at room temperature is about 900,000 Btu. Thus the overall thermal efficiency of the electric furnace melting operation is only of the order of 16-20%. It is for this reason that it has been generally believed that the conventional blast furnace—oxygen steelmaking combination represents a more efficient process than any of the presently extant direct reduction—electric furnace processes.

SUMMARY OF THE INVENTION

In accordance with the present invention a novel process is provided by which a gaseous direct reduction process may be interfaced with a melting unit whereby the off-gas of the melting unit provides a portion or all of the gaseous reductants required for the reduction of ore which in turn is fed directly into the melting unit along with iron-containing metals such as cast iron or steel scrap to produce a hot metal having a carbon content on the order of 1 to 2%. If desired, the melting unit may be operated to produce an excess quantity of reducing gases which may be used either to produce a surplus of prereduced metal or as a source of energy for other purposes. As a further feature of the invention, the intermediate material produced by the melter may be refined to a desired low carbon steel in an electric furnace or oxygen converter. In accordance with the present invention a charge of prereduced metal and cast iron scrap wherein the prereduced metal comprises between 30 and 100%, and preferably 40 to 60%, of the charge may be refined to steel with a reduction of up to about 30% in the total energy requirement, including the energy required to reduce the ore. The invention also encompasses apparatus by which the process may be performed.

Further details of the invention will become apparent to those skilled in the art from the following detailed description of the invention and the drawings in which:

FIG. 6 is a diagrammatic drawing of an apparatus capable of use in the performance of the process in which both the scrap and the ore are introduced into, and pass through, the reducing furnace;

FIG. 7 is a diagrammatic drawing of an apparatus wherein the scrap, flux and additives are introduced directly into the melting unit.

DESCRIPTION OF THE PREFERRED EMBODIMENTS

Figure 1:
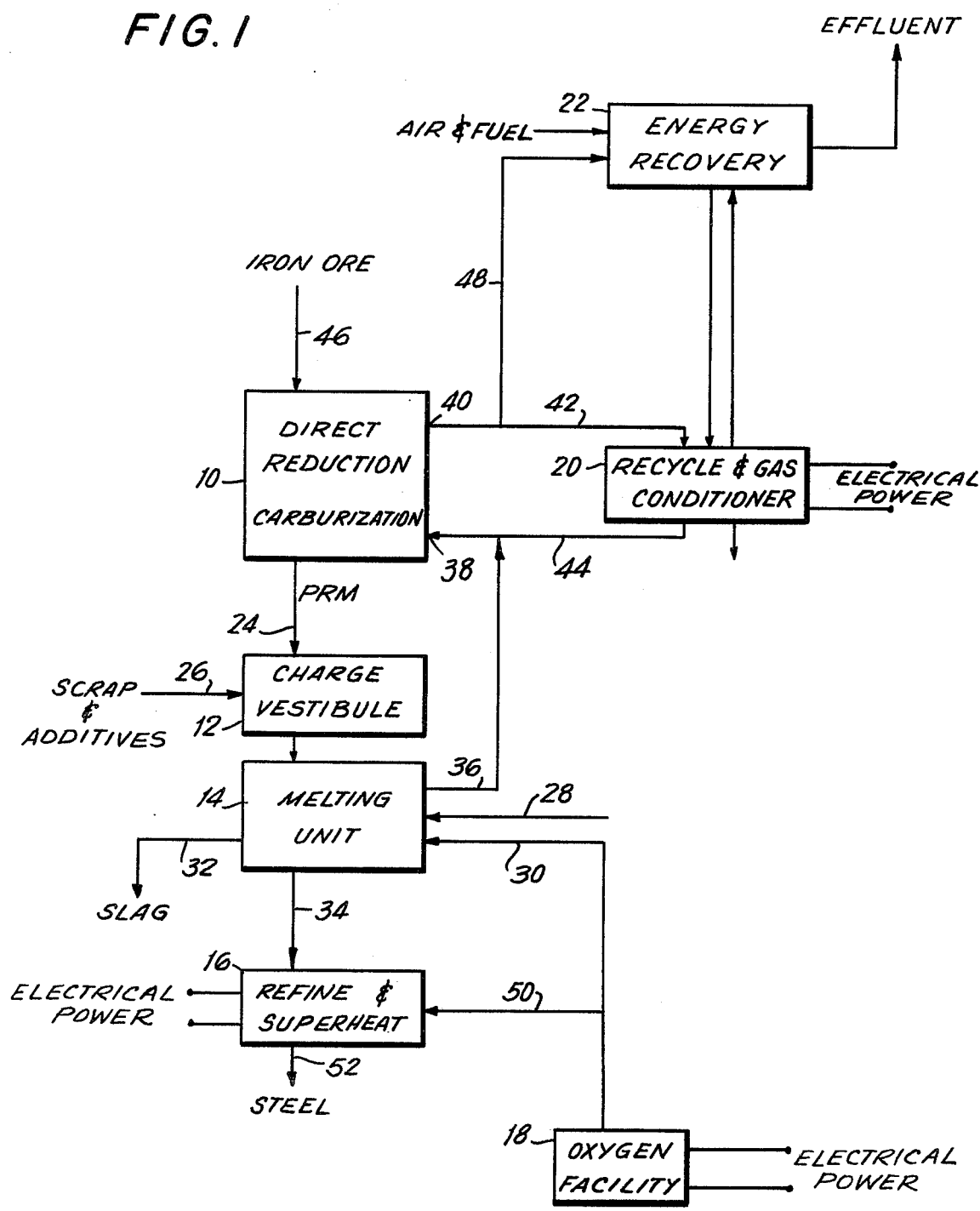
FIG. 1 is a schematic block diagram showing the interfacing of a gaseous direct reduction process with a melting unit operating with a reducing atmosphere and followed by a refining furnace to produce a low carbon steel.

Referring now to FIG. 1, 10 denotes a gaseous direct reduction furnace, 12 is a charge vestibule for the reception of hot prereduced metal, scrap, limestone and coke and 14 is a melting unit specially adapted to operate with a reducing atmosphere and to produce off-gas rich in hydrogen ($H_2$) and carbon monoxide (CO). A refining and superheating furnace is indicated at 16. Oxygen required for combustion in the melting unit 14 and for refining in the furnace 16 is supplied by an oxygen facility 18.

A portion of the top gas from the gaseous direct reduction furnace is conditioned in the gas conditioner 20 and then recycled to the direct reduction furnace 10. The remainder of the top gas from the direct reduction unit passes through an energy recovery unit 22 and is thereafter exhausted to the atmosphere.

For convenience the embodiment of the invention shown in FIG. 1 will be described with reference to an exemplary operation wherein substantially equal amounts of cast iron scrap and prereduced metal are melted and refined to produce a short ton of low carbon steel. It will be appreciated as set forth in more detail below, that the process is applicable to operations in which the prereduced metal may constitute between about 30 and 100% of the charge and to operations where the melting unit charge may also include iron-containing metals such as cast iron scrap, steel scrap or a mixture of both. Of course the quantity and composition of the off-gas and the temperatures at various points in the process will be affected by the specific nature of the charge materials. Although the process begins with the reduction of ore in the gaseous direct reduction furnace 10, the process is controlled essentially by the operation of the melting unit 14 and may, therefore, conveniently be described beginning with this unit.

The melting unit 14 is known as the Consolidated-Wingaersheek Cupola, or C-W Cupola, and is described in more detail in applicant's co-pending application Ser. No. 719428 filed Sept. 1, 1976. Application Ser. No. 719428 discloses a cupola equipped with specially designed burners capable of combusting oxygen and natural gas or fuel oil at about half the stoichiometric ratio to produce a reducing atmosphere within the cupola and off-gas rich in hydrogen and carbon monoxide. To produce a short ton of low carbon steel, the charge vestibule 12 of the cupola 14 is charged with prereduced metal 24 and scrap 26. The prereduced metal 24 which may, for example, comprise Midrex pellets, has a carbon content of about 1.0% and a weight of about 1079 pounds. The scrap charge 26 includes 1061 pounds of iron having a carbon content of about 3.5%, 87 pounds of limestone and 22 pounds of coke. The scrap charge 26 is cold but the prereduced metal 24 is preferably hot as received from the direct reduction furnace 10.

Fuel 28, preferably natural gas comprising essentially methane ($CH_4$), and an oxidizer 30, preferably oxygen, are mixed and burned in the cupola burners. Equal quantities, in this case about 6783 standard cubic feet, of methane and oxygen are burned to produce heat and a reducing atmosphere within the cupola according to the reaction:

$$CH_4 + O_2 \rightarrow [CO, CO_2, H_2, \text{and } H_2O]$$

Burners adapted to operate with a rich fuel/oxidant mixture are disclosed in the above-referenced co-pending application. Within the cupola charge, a number of reactions occur in addition to melting of the iron contained in the scrap and ore. In summary form these include:

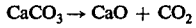

$$CaCO_3 \rightarrow CaO + CO_2$$

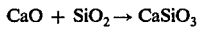

$$CaO + SiO_2 \rightarrow CaSiO_3$$

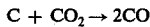

$$C + CO_2 \rightarrow 2CO$$

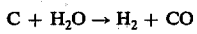

$$C + H_2O \rightarrow H_2 + CO$$

As a result of these reactions the gangue contained in the ore and the coke and limestone form about 142 pounds of a molten slag which may be slagged from the cupola and the iron from the scrap and ore form approximately a ton of hot metal containing about 2.3% carbon. In addition, off-gas comprising water ($H_2O$), carbon monoxide (CO), hydrogen ($H_2$) and carbon dioxide ($CO_2$) leaves the cupola 14 at a temperature of approximately 2000° F. The approximate composition of the cupola off-gas is as follows:

| Gas | SCF/Ton of Steel |
| --- | --- |
| $H_2O$ | 5586 |
| CO | 5586 |
| $H_2$ | 7980 |
| $CO_2$ | 1178 |

While the cupola off-gas is rich in hydrogen and carbon monoxide, both of which are effective as reducing agents, the off-gas also contains water vapor and carbon dioxide which may inhibit the reducing reaction. The reduction of ore may be regarded as a four step process by reference to the oxidation state wherein the ore progresses from hematite ($Fe_2O_3$) to magnetite ($Fe_3O_4$) to wüstite (FeO) to iron (Fe). Where the gaseous reductants are hydrogen and carbon monoxide, the combined reactions may be represented as follows:

$$3Fe_2O_3 + (CO/H_2) \rightarrow 2\ Fe_3O_4 + (CO_2/H_2O)$$

$$Fe_3O_4 + (CO/H_2) \rightarrow 3\ FeO + (CO_2/H_2O)$$

$$FeO + (CO/H_2) \rightarrow Fe + (CO_2/H_2O)$$

At temperatures below 560° C, wüstite (FeO) is unstable and the reduction of $Fe_3O_4$ proceeds directly to Fe as follows:

$$Fe_3O_4 + 4(CO/H_2) \rightarrow 3\ Fe + 4\ (CO_2/H_2O)$$

However, although the equilibrium for the reduction of hematite to magnetite is such that either CO or $H_2$ is very efficient at all temperatures, the equilibrium for the subsequent reducing steps is less favorable and depends both on the temperature and the ratio of $CO_2$ to CO and $H_2O$ to $H_2$. If we define $K_1$ as the equilibrium constant for the reduction of iron ore by CO and $K_2$ as the equilibrium constant for the reduction of iron ore by hydrogen, then $K_1 = (CO_2/CO)$ and $K_2 = (H_2O/H_2)$, and it can be shown that at 1600° F, $K_1$ must be less than 0.48 to maintain a reducing atmosphere but that as the temperature is reduced to 800° F, $K_1$ may be increased to about 1.35. On the other hand, at 1600°0 F, $K_2$ must be less than 0.55 but as the temperature falls to 800° F, $K_2$ must be decreased to about 0.15 to maintain a reducing condition.

It will be appreciated that the cupola off-gas may enter the gaseous reduction furnace at 1600°–800° F and leave the furnace at 600°–900° F so that the reducing reactions are being performed over a range of temperatures. Moreover, as the reduction proceeds, the reactions produce both $CO_2$ and $H_2O$ which tend to increase the values of $K_1$ and $K_2$ respectively.

As noted above, the composition of the cupola off-gas is such that $K_1 \cong 0.21$ while $K_2 \cong 0.7$. It is thus apparent that while reduction of the ore by carbon monoxide will be strongly favored, the reduction of the ore beyond the magnetite oxidation level will be inhibited unless $K_2$ is lowered substantially. According to the invention, the cupola off-gas 36 is introduced into the lower region 38 of the gaseous direct reduction furnace 10, passed in counter flow relation through the furnace and withdrawn at the upper end 40 of the furnace. As explained more fully below, a portion of the top gas 42 from the direct reduction furnace is directed into the gas conditioner 20 where the gas is cooled and treated to remove a portion of the water and carbon dioxide and thereafter reheated. The reheated and conditioned gas 44 is mixed with the gas stream 36 leaving the cupola 14 and re-enters the direct reduction furnace 10 at 38. As a result of the removal of substantial quantities of water and carbon dioxide in the conditioner 20, the values of $K_1$ and $K_2$ may be maintained well below 0.4 and 0.5 respectively so that reduction of the iron oxides by both hydrogen and carbon monoxide will occur within the direct reduction furnace 10.

In addition to the reducing reactions noted above, the reduced iron is carburized in the reducing furnace to about 1.0% carbon according to the reaction:

$$3\ Fe + 2\ CO \rightarrow Fe_3C + CO_2$$

The temperature relationships within the reducing furnace 10 must be regulated closely in order to maintain the rate of the reducing reaction at a maximum but limiting the temperatures, particularly in the lower regions of the furnace, so as to prevent sintering or agglomeration of the reduced ore. This may be accomplished in part, through the operation of the gas conditioner 20 which can be controlled to maintain the desired temperature of the gas entering the reduction furnace 10 at point 38. Moreover, the proportion of the top gas 42 which is recycled can be selected so that the reducing gas is recycled a plurality of times through the reducing furnace 10. The precise extent of the recirculation will, of course, depend upon the nature and composition of the raw ore 46 and the cupola off-gas 36 and the operation of the gas conditioner 20.

In the present example, 1516 pounds of ore comprising 1422 pounds of hematite and 94 pounds of gangue are charged into the reducing furnace 10 to yield 1079 pounds of prereduced metal 24. The portion of the top gas 48 from the reducing furnace 10 which is not recycled, may be burned with air and additional fuel, if necessary, to produce the heat required to reheat the top gas which passes through the conditioner 20 in the energy recovery unit 22. Any excess of energy available from the reducing furnace top gas 48 may be used, for example, to generate steam.

As noted above the metal 34 leaving the cupola 14 has a carbon content of about 2.3% and may have a temperature in excess of 2500° F. Further refining in the steelmaking furnace 16 is required to produce steel having a carbon content in the range of 0.1%. The furnace 16 is preferably an electric furnace or an oxygen converter. As shown in FIG. 1, about 722 SCF of oxygen 50 is required stoichiometrically to oxidize the carbon in the metal 34 from an initial level of 2.3% to a final level of 0.1%. The reaction of oxygen and carbon is exothermic and will raise the temperature fo the final steel 52 to the desired tapping temperature of about 2960° F.

An energy balance for the process exemplified in FIG. 1 reveals that about $7.19 \times 10^6$ Btu is provided in the form of fuel (natural gas); $1.2 \times 10^6$ Btu is provided electrically to produce the oxygen used for combustion and refining and about $0.66 \times 10^6$ Btu is provided as electrical power for gas conditioning and the operation of fans and blowers. Thus the total energy per ton of steel according to the present process is about $9.05 \times 10^6$ Btu.

Figure 3:
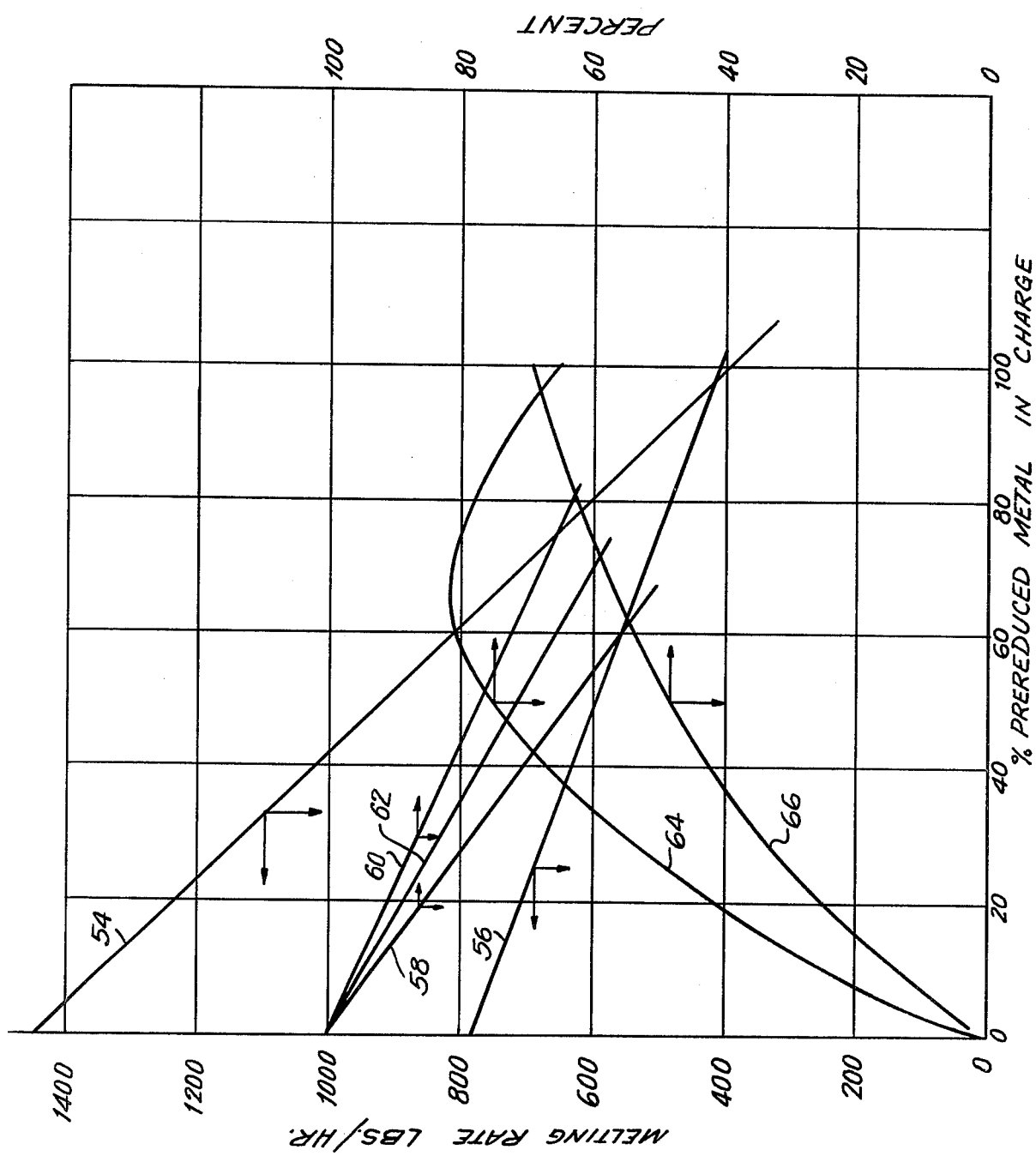
FIG. 3 is a graph showing the effect on the melting rate of a melting unit according to the present invention as a function of the proportion of prereduced metal employed in the melting unit charge.

FIG. 3 is a chart showing the relationship between cupola melting rate and percent of prereduced metal in the charge. Lines 54 and 56 represent a range of test data in a cupola having burners operated to produce a reducing atmosphere within the cupola and off-gas rich in hydrogen and carbon monoxide. In general, these data indicate that as the percentage of prereduced metal in the cupola charge is increased, the melting rate is decreased. This data is replotted respectively as lines 58 and 60 on a scale showing the percentage of the melting rate in a cupola operated with no prereduced metal in the charge. Line 62 is taken from FIG. 1 of the article "The Use of Sponge Iron in Foundries" appearing at p.53 of the September, 1976 issue of Modern Casting and shows results similar to those obtained by applicant with respect to the effect of prereduced metal on cupola melting rates.

Curve 64 is based upon the melting rate data of curve 54 for a cupola operated at half the stoichiomatic ratio of oxygen and fuel so as to produce a reducing atmosphere and off-gas rich in CO and $H_2$. Curve 64 demonstrates that a sufficient quantity of off-gas may be generated to effect the reduction of ore under any desired charging condition. Curve 64 shows that about 75% of the off-gas generated by the cupola is required to reduce a sufficient amount of ore to constitute 50% of the cupola charge. As set forth above, the remainder of the off-gas may then be burned to provide the energy for conditioning the top gas from the reducing furnace. Where the cupola is operated at a lower melting rate as shown by curve 66, a smaller proportion of the off-gas is required for reduction of the ore and a surplus of energy in the form of reducing furnace top gas becomes available.

Figure 5:
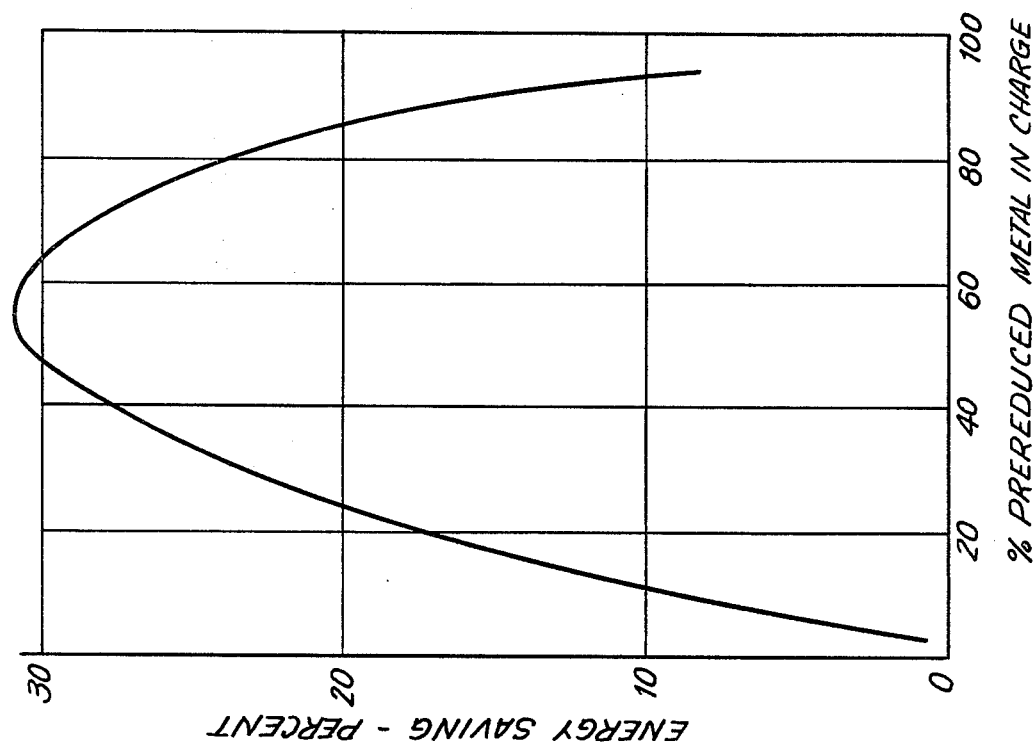
FIG. 5 is a graph showing the percent of energy saved by the process of the present invention compared with the best commercial practice as a function of the proportion of prereduced metal in the charge.
Figure 4:
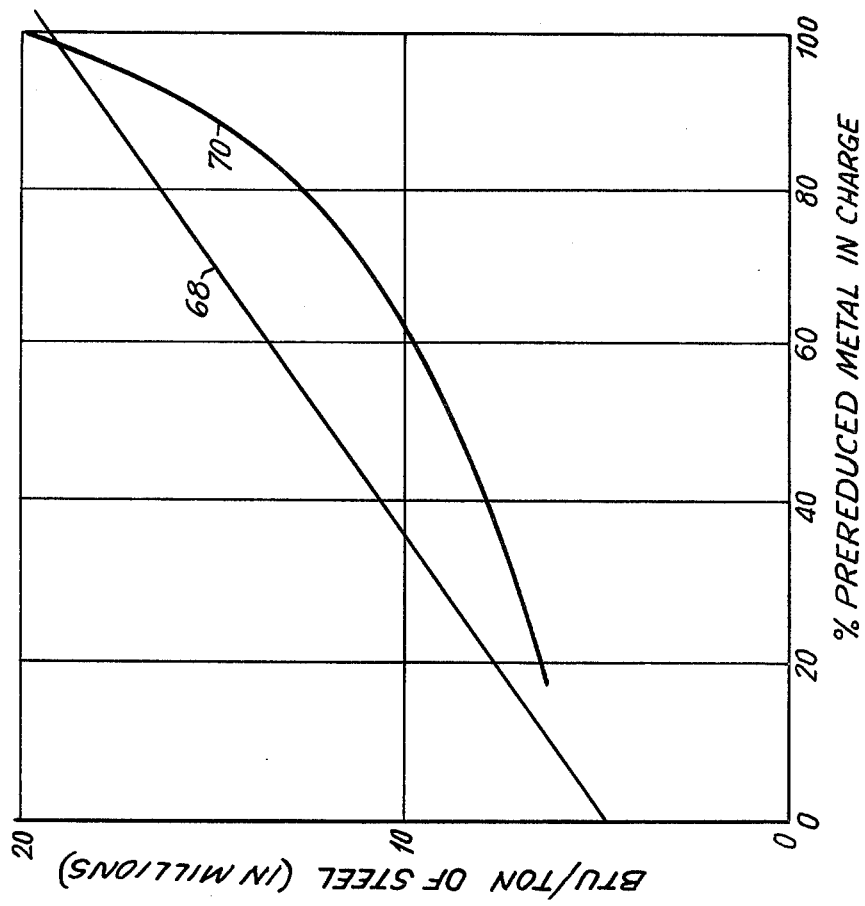
FIG. 4 is a graph showing a comparison of the energy required to produce steel using the best commercial practice and the energy required for the present process as a function of the proportion of prereduced metal in the charge.

FIG. 4 is a graph showing a comparison on an energy basis of a typical process according to the present invention and the best known commercial steelmaking process involving the direct reduction of ore followed by melting and refining in an electric arc furnace for various percentages of prereduced metal in the charge. Line 68 shows the energy required to produce steel by direct reduction and an electric arc furnace using between 0 and 100% prereduced metal as the charge. It will be noted that at 0% prereduced metal in the electric furnace charge the energy requirement is about $5 \times 10^6$ Btu/ton while with 100% prereduced metal in the charge the energy requirement is about $19.4 \times 10^6$ Btu/ton. Line 70 represents the process according to the present invention wherein the off-gas from the cupola melting unit provides the reductants required for the reduction of the ore. The data from FIG. 4 have been replotted in FIG. 5 to show the typical percent saving in energy possible with the process of the present invention compared with the best commercial process of direct reduction followed by melting and refining in an electric arc furnace. From FIG. 5 it will be appreciated that the process of the present invention will result in energy savings of about 30% for a charge including about 50% prereduced metal.

FIG. 7 shows in diagrammatic form an apparatus in which the invention according to the process set forth in FIG. 1 may be performed. The melting unit portion of the apparatus is indicated generally at 72 while the charge vestibule is shown at 74 and the direct reduction furnace at 76. The melting unit 72 and charge vestibule 74 are contained in a generally cylindrical steel shell 78 which is lined with an appropriate refractory material 80. Additional refractory material 82, preferably in the form of shaped bricks, is placed interiorly of the refractory material 80 so as to define a hearth 84, a heating and melting region 86 and a charge receiving region 88. Communicating with the hearth region 84 are a plurality of combustion chambers 90 adapted to receive burners 92. The burners 92 are designed to burn a rich fuel/oxidant mixture so as to produce combustion products rich in hydrogen and carbon monoxide. Burners as disclosed in applicant's co-pending application Ser. No. 719428 are particularly appropriate. A spout 94 communicates with the hearth 84 slightly above the bottom thereof to direct the molten metal from the melting unit into an oxygen converter or electric furnace (not shown) for further refining to produce steel. One end of a refractory lined additive passage 96 communicates with the charge vestibule 74 while the other end communicates with an additive hopper 98 through a gas sealing valve 100. The outboard end of the additive hopper 98 is also fitted with a gas tight closure 102. Additives comprising iron or steel scrap, coke, limestone and fluxes may be placed in the hopper 98 and introduced into the charge vestibule 74 as required.

The direct reduction furnace 76 comprises a generally cylindrical steel shell portion 104 having a refractory lining 106 which communicates with the charge vestibule 74 through a refractory lined converging section 108 and an orifice 110. At least one orifice 113 is formed in the upper region of the direct reduction furnace 76 for the egress of gas. At least one orifice 115 is provided in the charge vestibule 74 through which reconditioned gas from the direct reduction furnace 76 may be recirculated into the charge-receiving region 88 of the charge vestibule 74 and thence through the orifice 110 and the interior 112 of the furnace 76. Of course, fresh gaseous reductants may also be mixed into the reconditioned gases if desired.

The top of the direct reduction furnace 76 is closed by a charge hopper 114 provided with appropriate gas sealing means (not shown).

It will be appreciated that appropriate quantities of ore may be introduced into the direct reduction furnace 76 to react with the gaseous reductants and produce prereduced metal which may then be admitted to the charge vestibule region 88 together with the desired quantity of scrap, fluxes and additives to form the charge for the melting unit 72. In the hearth portion of the melting unit temperatures in the range of 3000° to 4000° F are produced to melt the charge and form a pool of hot metal 116 suitable for final refining in a steelmaking vessel. As shown in FIG. 7, the hearth portion 84 of the melting unit is of smaller diameter than the heating and melting region 86 of the melting unit so as to provide a circumferential shoulder 118 to support the burden in the melting unit. The effect is to produce an arched combustion chamber and avoid the risk of solid material falling into the molten pool 116 and possibly quenching and solidifying the pool. The molten pool 116 is an important aspect of the melting unit hearth design in that it protects the refractory bottom of the melting unit and simultaneously absorbs heat from the gaseous combustion products. Moreover, retention of a quantity of molten metal in the pool provides an opportunity for the fluxes and other additive agents to react with the slag and promote the desired slag-metal reactions.

Preferably the combustion chambers 90 terminate at their inward ends in reduced sections 120 which increase the velocity of the products of combustion to form a gaseous jet capable of penetrating into the hearth region 84 and creating a highly turbulent region in which heat transfer to the burden and to the molten pool 116 is enhanced.

Figure 2:
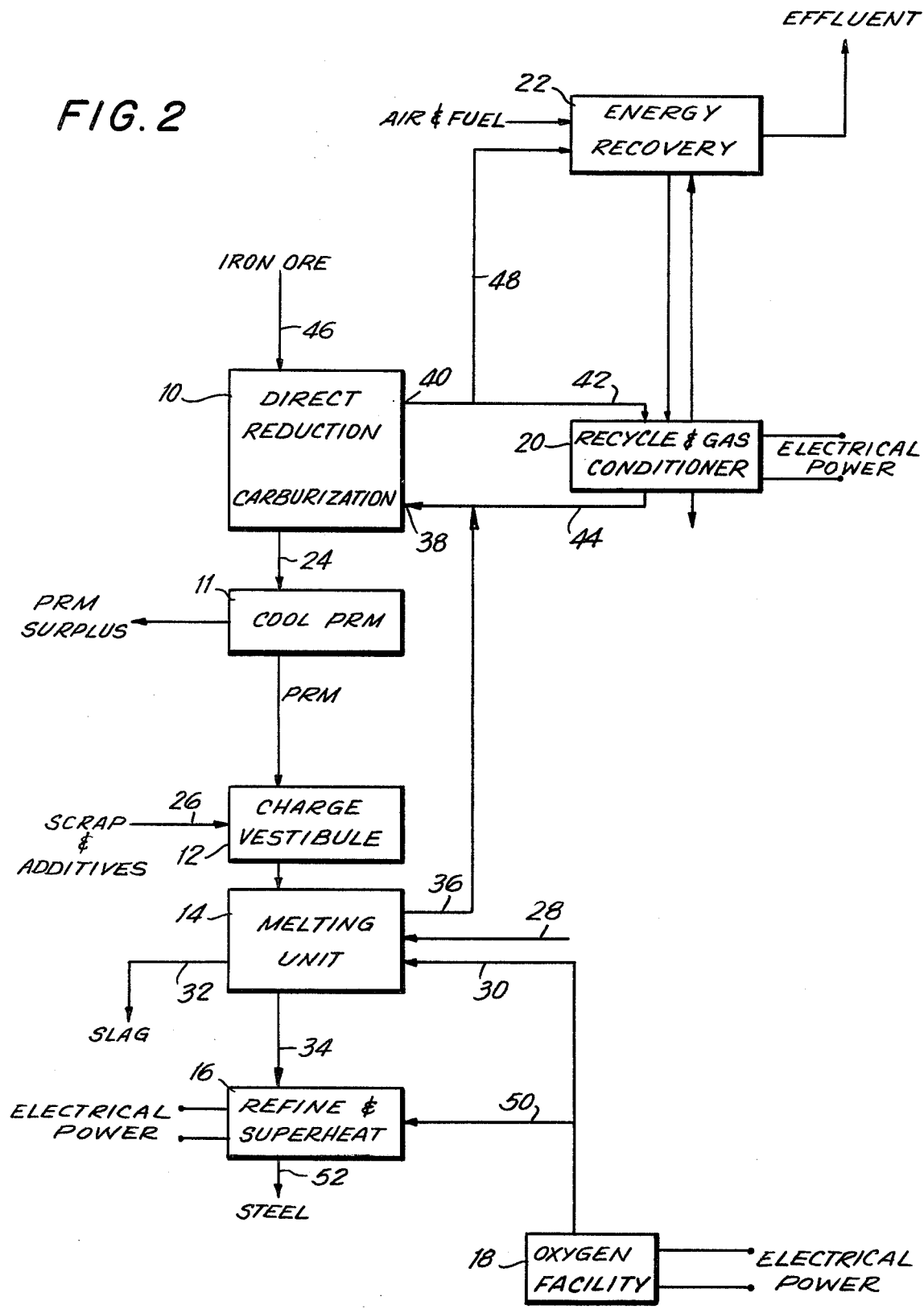
FIG. 2 is a similar schematic block diagram showing the interfacing of a gaseous direct reduction process with a melting unit and a refining furnace but including a step whereby the prereduced metal is cooled prior to admission into the melting unit.

FIG. 2 shows in the form of a block diagram a modification of the process shown in FIG. 1. The principal difference lies in the step 11 of cooling the prereduced metal within, or immediately upon its exit from, the direct reducing furnace 10 to ambient temperature. By the use of this technique, the operating rate of the furnace 10 is not directly tied to the operation of the melting unit 14 and it is therefore possible to utilize more nearly the full reducing capacity of the melter off-gas to increase the production of prereduced metal. Of course, by cooling the prereduced metal portion of the melting unit charge the sensible heat of the prereduced metal is lost and must be made up in the melting unit through the combustion of an additional amount of fuel. This will necessarily increase the total energy requirement of the process and therefore decrease the efficiency somewhat. Except as noted above, the process shown in FIG. 2 is the same as that shown in FIG. 1 as indicated by the use of the same reference characters. The excess prereduced metal may be used in other steelmaking operations or sold as an item of commerce.

FIG. 6 illustrates a modified form of apparatus for use in the practice of the process of the present invention. The apparatus differs from that shown in FIG. 7 in that the charge vestibule 74 and the associated additive passage and additive hopper have been eliminated. The elements of the apparatus of FIG. 7 are indicated by the same reference numerals and perform a similar function in both embodiments of the apparatus. In the embodiment of FIG. 6, the required quantities of scrap, fluxes and other additives together with the ore are charged into the direct reduction furnace 76 through the charge hopper 114. The effect of this modification is that the scrap, fluxes and other additives will be preheated in the direct reduction furnace 76 instead of in the upper regions of the melting unit 72. Thus, the temperature of the melting unit off-gas will be somewhat higher than that produced in the embodiment of FIG. 7. As noted above it is necessary to limit the maximum temperature of the melting unit off-gas to prevent sintering or agglomeration of the charge within the reducing furnace 76.

In FIGS. 1 and 2 it is indicated that the iron ore is introduced into the reducing furnace 10 while the scrap, i.e., the iron-containing metals, and other additives including coke, limestone and fluxes are introduced into the charge-receiving portion of the melting unit 14. It will be appreciated that, as indicated in FIG. 6, all of the charge materials may be introduced into and passed through the reducing furnace 10, if desired. In this event, a portion of the heating load of the melting unit 14 will be transferred to the reducing furnace 10. As a result, the temperature of the off-gas leaving the melting unit 14 will be somewhat higher.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A process for the production of intermediate hot metal for use in steelmaking comprising introducing a charge of ore containing oxides of iron and gangue as lumps, briquettes, pellets or other agglomerates into a reducing furnace, heating said charge in said reducing furnace by means of a reducing atmosphere comprising a mixture of top gas recycled from said reducing furnace and off-gas containing hydrogen and carbon monoxide produced in a melting unit to reduce said oxides of iron substantially to iron, carburizing a portion of said iron to iron carbide within said reducing furnace by reacting said iron with a portion of the carbon monoxide contained in said top gas and said off-gas from said melting unit, introducing said reduced and carburized iron and said gangue together with slag forming additives and fluxes into the upper region of a melting unit, and melting said reduced and carburized iron, said gangue and said slag forming additives and fluxes under a reducing atmosphere produced by the combustion of a rich fuel/oxidant mixture to produce a molten slag and molten metal comprising essentially iron and carbon.

2. The process as described in claim 1 wherein the reduced and carburized iron comprises between 30% and 70% of the metallic charge of the melting unit and the balance of the metallic charge comprises iron-containing metals.

3. The process as described in claim 1 wherein the reduced and carburized iron comprises between 40% and 60% of the metallic charge of the melting unit and the balance of the charge comprises iron-containing metals.

4. The process as described in claim 1 wherein the molten metal comprising essentially iron and carbon is further refined in an electric furnace to produce steel.

5. The process as described in claim 1 wherein the molten metal comprising essentially iron and carbon is further refined in an oxygen converter to produce steel.

6. A process for the production of intermediate hot metal for use in steelmaking comprising introducing a charge of ore containing oxides of iron and gangue as lumps, briquettes, pellets or other agglomerates into a reducing furnace, heating said charge in said reducing furnace by means of a reducing atmosphere comprising a mixture of top gas recycled from said reducing furnace and off-gas containing hydrogen and carbon monoxide produced in a melting unit to reduce said oxides of iron substantially to iron, carburizing a portion of said iron with a portion of the carbon monoxide contained in said top gas and said off-gas from said melting unit, cooling the reduced ore comprising the substantially metallic iron, carburized iron and gangue contained in the said charge of ore, introducing at least a portion of said reduced ore together with slag forming additives and fluxes into the upper region of a melting unit, and melting said portion of said reduced ore and said slag forming additives and fluxes under a reducing atmosphere produced by the combustion of a rich fuel/oxidant mixture to produce molten slag and molten metal comprising essentially iron and carbon.

7. The process as described in claim 6 wherein the reduced and carburized iron comprises between 30% and 70% of the melting unit charge of the melting unit and the balance of the metallic charge comprises iron-containing metals.

8. The process as described in claim 6 wherein the reduced and carburized iron comprises between 40% and 60% of the metallic charge of the melting unit and the balance of the charge comprises iron-containing metals.

9. The process as described in claim 6 wherein the molten metal comprising essentially iron and carbon is further refined in an electric furnace to produce steel.

10. The process as described in claim 6 wherein the molten metal comprising essentially iron and carbon is further refined in an oxygen converter to produce steel.

11. A process for the production of intermediate hot metal for use in steelmaking comprising introducing a charge of ore containing oxides of iron and gangue as lumps, briquettes, pellets or other agglomerates, slag forming additives and fluxes into a reducing furnace, heating said charge in said reducing furnace by means of a reducing atmosphere comprising a mixture of top gas recycled from said reducing furnace and off-gas containing hydrogen and carbon monoxide produced in a melting unit to reduce said oxides of iron substantially to iron, carburizing a portion of said reduced iron to iron carbide within said reducing furnace by reacting said reduced iron with a portion of the carbon monoxide contained in said top gas and said off-gas from said melting unit, and introducing said reduced and carburized iron together with said gangue, said slag forming additives and fluxes into the upper region of a melting unit, and melting said reduced and carburized iron, said gangue, and said slag forming additives and fluxes under a reducing atmosphere produced by the combustion of a rich fuel/oxidant mixture to produce molten slag and molten metal comprising essentially iron and carbon.

12. The process as described in claim 11 wherein the reduced and carburized iron comprises between 30% and 70% of the melting unit charge of the melting unit and the balance of the metallic charge comprises iron-containing metals.

13. The process as described in claim 11 wherein the reduced and carburized iron comprises between 40% and 60% of the metallic charge of the melting unit and the balance of the charge comprises iron-containing metals.

14. The process as described in claim 11 wherein the molten metal comprising essentially iron and carbon is further refined in an electric furnace to produce steel.

15. The process as described in claim 11 wherein the molten metal comprising essentially iron and carbon is further refined in an oxygen converter to produce steel.

16. A process for the production of intermediate hot metal for use in steelmaking comprising introducing a charge of ore containing oxides of iron and gangue as lumps, briquettes, pellets or other agglomerates into a reducing furnace, heating said charge in said reducing furnace by means of a reducing atmosphere comprising a mixture of top gas containing hydrogen, water, carbon monoxide and carbon dioxide recycled from said reducing furnace and off-gas containing hydrogen, carbon monoxide, water and carbon dioxide produced in a melting unit to reduce said oxides of iron substantially to iron, carburizing a portion of said iron to iron carbide within said reducing furnace by reacting said iron with a portion of the carbon monoxide contained in said top gas and said off-gas from said melting unit, cooling and conditioning a portion of said top gas from said reducing furnace to remove a portion of the water and carbon dioxide contained therein, reheating said portion of said cooled and conditioned top gas, recycling said reheated and conditioned top gas together with said off-gas from said melting unit into said reducing furnace, introducing said reduced and carburized iron together with said gangue, slag forming additives and fluxes into the upper region of a melting unit, and melting said reduced and carburized iron, said gangue, said slag forming additives and fluxes under a reducing atmosphere produced by the combustion of a rich fuel/oxidant mixture to produce molten slag and molten metal comprising essentially iron and carbon.

17. The process as described in claim 16 wherein the reduced and carburized iron comprises between 30% and 70% of the metallic charge of the melting unit and the balance of the metallic charge comprises iron-containing metals.

18. The process as described in claim 16 wherein the reduced and carburized iron comprises between 40% and 60% of the metallic charge of the melting unit and the balance of the charge comprises iron-containing metals.

19. The process as described in claim 16 wherein the molten metal comprising essentially iron and carbon is further refined in an electric furnace to produce steel.

20. The process as described in claim 16 wherein the molten metal comprising essentially iron and carbon is further refined in an oxygen converter to produce steel.

21. The process as described in claim 16 wherein a portion of the heat required to reheat said conditioned top gas is produced by the combustion of another portion of said top gas with an oxidant.

* * * * *